UNITED STATES PATENT OFFICE.

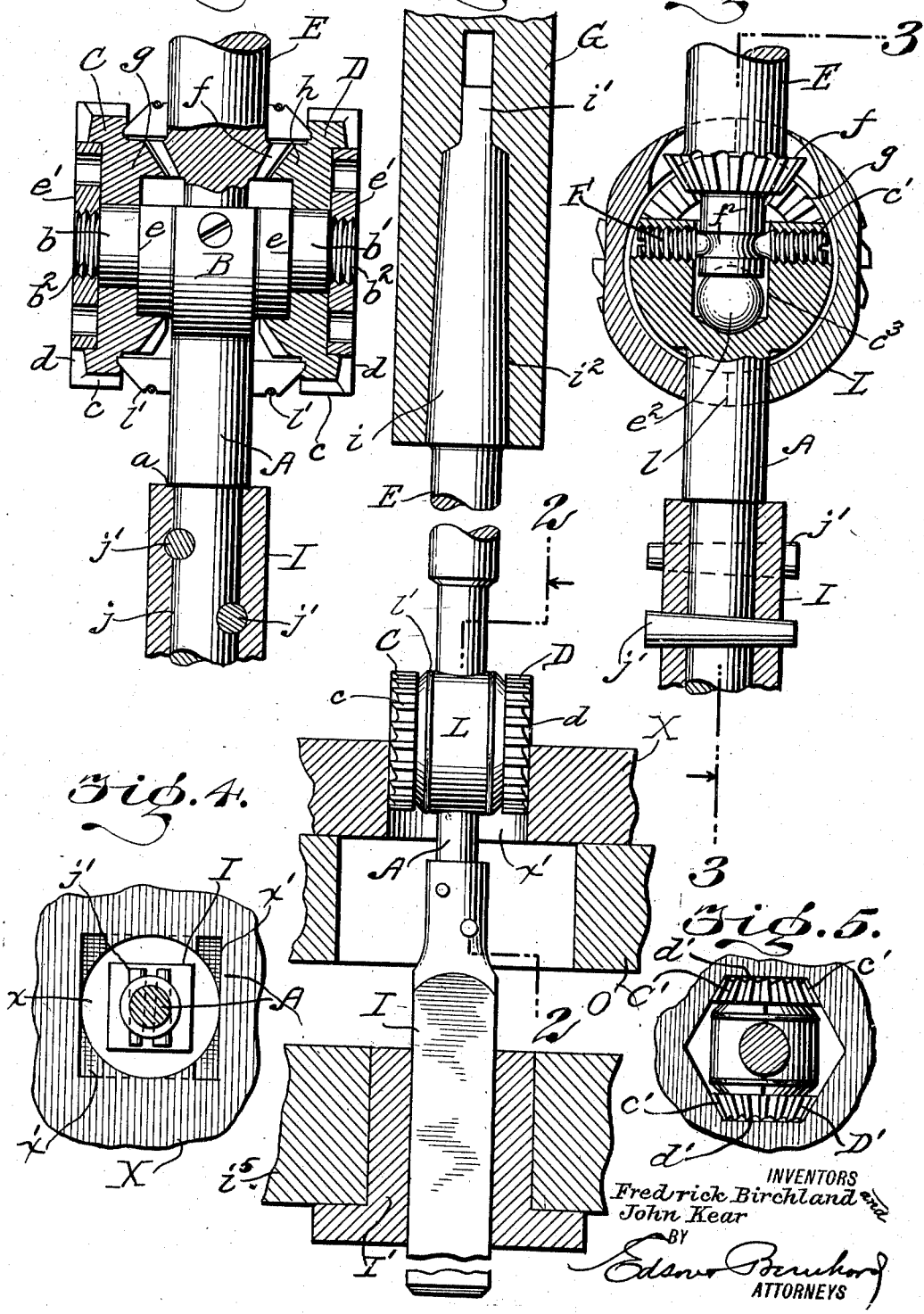

FREDRICK BIRCHLAND AND JOHN KEAR, OF BROOKLYN, NEW YORK.

MACHINE FOR CUTTING ANGULAR HOLES IN MATERIAL.

1,321,881.     Specification of Letters Patent.     Patented Nov. 18, 1919.

Application filed June 13, 1916. Serial No. 103,561.

*To all whom it may concern:*

Be it known that we, FREDRICK BIRCHLAND and JOHN KEAR, both citizens of the United States, residing at the city of New York, borough of Brooklyn, county of Kings, and State of New York, have invented a certain new and useful Machine for Cutting Angular Holes in Material, of which the following is a specification.

This invention is a machine for cutting square hexagonal or angle-sided holes in material, the same being especially designed for cutting such holes in metal and other hard materials, although it is apparent that the machine may be used, also, for cutting into wood and relatively soft materials.

Among the objects of the invention are, first, the provision of cutting mechanism of a simple and efficient nature, operating to cut an angle-sided hole with clean smooth surfaced walls, free from internal irregularities or roughnesses; second, to exclude the cuttings from the gears used in the machine; third, to take up the thrust on the parts without undue friction and wear, and to provide for the ready adjustment and assemblage of said parts with respect to the material prior to cutting the hole and subsequently thereto.

Briefly stated, the invention aims to cut holes quickly, economically and with smooth walls to the holes, in substitution for the slow, tedious and expensive operation of slotting metal and other hard materials.

A salient feature of the invention consists of a plurality of cutters each characterized by the provision of two series of teeth, one series being upon the periphery of the cutter and the other series upon a lateral surface of said cutter, said two series of teeth of each cutter acting simultaneously upon three walls of the hole to be cut, and said cutters operating as the work progresses to so act upon the material as to discharge the cuttings from the hole.

The invention consists, also, in the employment of a cutter-carrier in the form substantially of a T-shaped crosshead upon which the cutters are mounted, combined with a spindle, and with certain gears, whereby the cutters are rotated simultaneously and in opposite directions, said gears being incased to exclude therefrom the cuttings of material.

The invention consists, also, in the employment of means for retaining the cutters in a predetermined relation to the walls of the hole being cut, while at the same time permitting the required feed movement of the cutters into the material; said retaining means being shiftable, after the cutters pass once through the material, in order to position said cutters so as to operate upon the material in order to cut other walls of the hole, and with smooth clean cuts, and ultimately result in the formation of holes the walls of which are at an angle one to the other, as *e. g.* square holes, hexagonal holes, etc.

Other features and advantages of the invention will appear from the following detailed description taken in connection with the drawings, wherein Figure 1 is a side elevation of the cutting mechanism embodying this invention, the same being shown in operative relation to certain parts of a drill presss and to a piece of material in which a square hole is to be cut.

Fig. 2 is a vertical section through the cutting mechanism on the line 2—2 of Fig. 1.

Fig. 3 is a section at right angles to Fig. 2, taken in the plane of the dotted line 3—3 looking in the direction of the arrow.

Fig. 4 is a horizontal section through the stem of the crosshead, showing the angle-sided guide post to which said stem is detachably connected by tapering pins, said view illustrating in plan the hole in the material through which the device is initially introduced and partly showing the cuts made in the material to form the square-sided hole therein.

Fig. 5 is a diagrammatic view illustrating cutters of another form and adapted to be positioned to successive positions for cutting a hexagonal hole in hard or soft material.

A designates the stem of a substantially T-shaped crosshead which constitutes the cutter carrier. Said stem is reduced at its lower part to form an intermediate shoulder $a$. The head B of the crosshead is enlarged as compared with the cross sectional dimensions of the stem A, and this head is provided with trunnions $b$ $b'$ each having a threaded extremity $b^2$. Furthermore, the enlarged head B is provided with a central chamber $c^3$ and with holes $c'$, opening into the chamber $c^3$, said holes being internally threaded for a purpose which will presently appear.

In the embodiment of the invention shown we employ two rotating cutters C, D, the former being journaled on the trunnion $b$, and the latter upon the trunnion $b'$. These cutters are in the form of disks, and they are provided with central openings adapted to receive the trunnions $b\ b'$, whereby the cutters are mounted for free rotation upon the crosshead at the respective sides of the stem A. Any suitable means may be employed for retaining the cutters against sidewise or lateral displacement upon the trunnions, but as shown the crosshead is provided with shoulders $e$ against which the cutters bear and on the threaded studs $b^2$, of said crosshead are screwed the retaining disks $e'$. Said retaining disks are provided with central openings, the opening in each disk being screw-threaded, so that the disks are adapted to be screwed upon the studs $b^2$ and to have frictional contact with the cutters in a way to preclude the disks from turning off the studs. As shown, the cutters rotate to the right, and the disks have left hand threaded openings, the result of which is that the disks hold the cutters effectively while permitting free rotation thereof.

Each cutter is provided with two series of teeth $c\ d$, the teeth $c$ being provided on the periphery of said cutter disk, whereas the teeth $d$ project from one of the lateral faces of said cutter disk. The cutters C D are positioned on the cutter head so that the teeth $d$ project beyond the outside lateral surfaces of the two cutters, whereby the laterally extending teeth $d$ of cutters C D act upon two of the walls of the hole to be cut, whereas the peripheral cutting teeth $c$ of said two cutters act upon two other walls of the hole to be cut, as a result of which the two cutters act simultaneously upon the four walls of a square hole.

The chamber $c^3$ within the head of the cutter carrier extends upwardly through said head in order that the lower extremity of a vertical spindle or shaft E may fit within said chamber $c^3$, and for the purpose of taking up the end thrust of this shaft E, a ball bearing $e^2$ is positioned within the chamber $c^3$, said ball bearing having contact with the bottom of the chamber, and the lower end of the shaft E contacting with said bearing in order to minimize the friction and wear between the surfaces of the parts. This shaft E is provided near its lower end with a bevel pinion $f$, the latter meshing with bevel pinions $g$, $h$ provided upon the inner faces of the cutters C D. The rotation of the shaft E imparts rotary motion simultaneously to the two cutters C, D, said cutters rotating in opposite directions to each other, as a result of which the resistance of the hard material to the cutters balances the device when at work in the operation of cutting the hole in the material. As shown, the gears $g$, $h$ are integral with the cutters C, D and in a similar manner the bevel pinion $f$ is integral with the shaft E, but, obviously, the gears may be made separate from the shaft and the two cutters.

For the purpose of retaining the shaft E in connected relation to the cutter carrier B, suitable means are provided, as shown in Fig. 2, said means consisting of screws F which are threaded into the openings $c'$ of the cutter head. The inner ends of the screws extend into an annular groove $f^2$ provided in the lower part of the shaft E, said screws operating to retain the crosshead B in a connected relation to the shaft E and at the same time permit said shaft to turn freely on its step bearing $e^2$ within the crosshead.

The driving shaft E is tapered at its upper portion, as at $i$, and is provided with a shank $i'$. Said upper part of the driving shaft is received within a tapering socket $i^2$ of a drill spindle G, whereby the driving shaft is coupled with the drill spindle for rotation therewith and is removable at will therefrom.

The stem A of the crosshead coöperates with a guide post I. This guide post is provided with a socket $j$ into which the lower end of the stem is inserted, suitable provision being made for locking the guide post and the stem one to the other so as to preclude a relative rotative movement between the parts. The locking means shown consists of drift pins $j'$ which are driven through suitable openings provided in the guide post and the stem, said drift pins being reversed to each other, as shown in Figs. 2 and 4.

The cross sectional shape of the guide post I corresponds to the shape of the hole to be cut in the material, and this guide post is fitted slidably in a suitable guiding member, but is retained by the guiding member from rotative movement, whereby the guide post operates to preclude the crosshead and the cutters from turning within the hole while cutting the latter in the material. At the same time, the cutters C D are free to rotate on the trunnions $b\ b'$ when rotary motion is communicated by the drill spindle G to the cutter-driving shaft E. The cross sectional form of the guide post will vary according to the kind of hole which is to be cut in the material, and in this connection it may be stated that the shape of the cutters C D may also be varied according to the kind of hole to be cut. The guide post is shown as being free to slide within an opening provided in a bushing I', the latter being retained fixedly in position by suitable means, such as the table $i^5$.

Means are provided for incasing the gears whereby the cuttings of material are precluded from working into the teeth of the gears and mutilating the same. The casing L is divided vertically into two halves, the meeting edges l of which are recessed to fit around the stem A and shaft E. The two parts of the divided casing inclose the gears f, g, h and the enlarged part of the cross head B, said halves of the casing being held together by spring rings l' or other devices adapted to fit within grooves of the casing, as shown in Figs. 1 and 3. The casing L fits snugly around the stem A, shaft E and the crosshead B, the edge portions of the casing being positioned quite close to, or entering grooves provided in, the cutters C, D, thus excluding the cuttings of material from the gears.

This being the construction of our device, the operation may be described as follows:—

A hole x is cut preliminarily through the material X by boring, drilling, or otherwise, said material being placed upon a suitable work holder O. The guide post I is thrust through the opening x formed in the material, whereupon the shaft E is connected with the drill spindle, and said guide post is fitted in the bushing I'. The device is now ready for operation upon the material X, the shaft E being rotated by the drill spindle so as to impart rotative movement simultaneously to the two cutters. As the cutters descend into the material, the feed movement of the drill spindle is communicated to the shaft, the cutters and the guide post, the latter sliding within the bushing. The guide post and the bushing coöperate in retaining the crosshead B in non-rotative relation to the material X, but the cutters C D are free to rotate upon the crosshead in order that the teeth c d will cut into the material on parallel lines. The teeth d act on two walls of the material, whereas the teeth c cut two other walls in the material. Now, when the cutters C, D pass once through the material, the result is two slots indicated at x' in Fig. 4. In case a square hole is to be cut in the material, the cutters and post are raised and the guide post is given a quarter turn and lowered into the bushing, thus presenting the cutters C, D for the teeth d to produce two other parallel cuts in the material and the peripheral teeth c cut other slots similar to the slots x', which last mentioned slots intersect with the slots x', whereby the material required to be removed to produce the square hole is cut out of the said piece x.

In case a hexagonal hole is to be cut in the material, as in Fig. 5, the cutters will be differently shaped and a six-sided post I employed.

It will be noted that the cutters C' D' are provided with laterally extending teeth d' and with peripheral teeth c', but instead of the peripheral teeth c' being at a right angle to the laterally extending teeth as in Fig. 3 when cutting a square hole, said teeth c' are at an obtuse angle to the teeth d' in the cutters C' D' for cutting a hexagonal hole. With cutters of this form and by using a guide post and bushing of hexagonal cross section, the several working parts are adapted to be operated and adjusted for the successive cuts to produce the hexagonal hole of Fig. 5.

Of course, other angle-sided holes may be produced in hard material by the use of appropriate cutters and guide posts.

It will be noted that the guide post I is connected detachably to the stem of the cutter head by the drift pins j j' so that a post I of one form can be removed and another post of a different form attached to the stem of the crosshead; thus a square post may be replaced by a hexagonal post, and vice versa. Again, the retaining disks e' may be unscrewed, and cutters C D removed from the crosshead, after which other cutters as C' D' may be mounted on the crosshead and the disks e' replaced, thus adapting the machine for cutting square holes or hexagonal holes, as desired.

Having thus fully described the invention, what we claim as new, and desire to secure by Letters Patent is:

1. A device for cutting angle-sided holes in material embodying a rotary spindle, a carrier provided with a stem which is positioned substantially in alinement with the spindle, means coöperating with said stem for retaining the carrier from rotative movement, a thrust bearing intermediate the carrier and the spindle, a plurality of cutters mounted on said carrier, and means operated by said spindle for imparting rotative movement to said cutters.

2. A device for cutting angle-sided holes in material embodying a rotary spindle, a carrier separate from said spindle, said carrier being provided with a stem positioned substantially in alinement with said spindle, means for separably coupling said carrier to the spindle, said spindle having a step-bearing in said carrier, retaining means in which the stem is fitted for sliding movement, said retaining means operating to preclude rotative movement of the carrier relatively to the spindle, and cutting mechanism mounted on the carrier, said cutting mechanism being operated by the rotative movement of said spindle.

3. A device for cutting holes the walls of which are at an angle embodying a plurality of cutter disks each of which is provided with a series of teeth extending beyond the periphery of said cutter disk and with a series of other teeth extending laterally from a side face of the cutter disk, a cutter-carrier for said plurality of cutter disks, means for imparting rotative movement to said cutter disks and slidable retaining means for holding the cutter carrier in operative positions, said retaining means permitting the cutter carrier and the cutter disks to be axially shifted to different operative positions.

4. A device for cutting holes the walls of which are at an angle, embodying a plurality of cutter disks each provided with a series of well defined teeth extending beyond the periphery of said disk and with a like series of lateral teeth extending beyond one face of said disk, a cutter carrier upon which the disks are mounted for rotative movement, driving means for imparting rotative movement in opposite directions simultaneously to said disks, a retaining stem in axial alinement with said cutter carrier, and a guide member in which the retaining stem is fitted for sliding movement.

5. In a device for cutting angle-sided holes, the combination of a crosshead provided with a chamber, a drive shaft having a step bearing within the chambered crosshead, a plurality of cutters mounted upon said crosshead, gearing between the drive shaft and said cutters, and a plurality of coöperating guide devices fitted for sliding movement relatively to one another and operating to retain the crosshead in non-rotative relation to the drive shaft, one of said plurality of guide devices being rigidly connected with the crosshead.

6. In a device for cutting angle-sided holes, the combination of a crosshead provided with a chamber, a drive shaft having a step bearing within the chambered crosshead, a plurality of cutters mounted upon said crosshead, means for retaining the cutters in operative positions upon the crosshead, gearing between the guide shaft and said cutters, a sectional casing separably coupling said crosshead and the drive shaft and incasing said gearing, and directing means coöperating with said crosshead.

In testimony whereof, we have hereunto signed our names.

FREDRICK BIRCHLAND.
JOHN KEAR.